United States Patent [19]  [11] 4,329,445
Del Pesco  [45] * May 11, 1982

[54] PROCESS FOR PREPARING A TETRAHYDROFURAN-ALKYLENE OXIDE COPOLYMER WITH TREATED BENTONITE CATALYST

[75] Inventor: Thomas W. Del Pesco, Wilmington, Del.

[73] Assignee: E. I. Du Pont de Nemours and Company, Wilmington, Del.

[ * ] Notice: The portion of the term of this patent subsequent to Oct. 14, 1997, has been disclaimed.

[21] Appl. No.: 154,844

[22] Filed: May 30, 1980

Related U.S. Application Data

[62] Division of Ser. No. 34,604, Apr. 30, 1979, Pat. No. 4,235,751.

[51] Int. Cl.$^3$ .............................................. C08G 65/20
[52] U.S. Cl. ................................... 528/416; 528/403; 528/408; 528/413; 568/613; 568/617
[58] Field of Search ............... 528/416, 413, 408, 403; 568/613, 617

[56] References Cited

U.S. PATENT DOCUMENTS

| | | | |
|---|---|---|---|
| 3,201,197 | 8/1965 | Showalter | 252/450 |
| 3,213,037 | 10/1965 | Hodgkiss | 252/450 |
| 3,328,467 | 6/1967 | Hamilton | 568/613 |
| 3,412,039 | 11/1968 | Miller | 252/428 |
| 3,997,563 | 12/1976 | Dale et al. | 260/338 |
| 4,087,383 | 5/1978 | Gernand et al. | 252/455 R |
| 4,127,513 | 11/1978 | Bellis | 568/613 |
| 4,228,272 | 10/1980 | Del Pesco | 528/413 |
| 4,235,751 | 11/1980 | Del Pesco | 528/413 |

FOREIGN PATENT DOCUMENTS 854958  11/1960  United Kingdom .

OTHER PUBLICATIONS

Süd-Chemie, A. G., Product Bulletin, "K-Catalysts", 17 pages, Jul. 1976.

*Primary Examiner*—Harold D. Anderson

[57] ABSTRACT

A modified montmorillonite clay is prepared by heating it, impregnating it with an organic liquid, acid-activating it with a strong acid, and then washing it with water until it is substantially free of acid anions. The modified clay is useful as a catalyst, particularly for the preparation of tetrahydrofuran/alkylene oxide copolymers.

5 Claims, No Drawings

PROCESS FOR PREPARING A TETRAHYDROFURAN-ALKYLENE OXIDE COPOLYMER WITH TREATED BENTONITE CATALYST

CROSS-REFERENCE TO RELATED APPLICATION

This application is a divisional of application Ser. No. 034,604, filed Apr. 30, 1979, now U.S. Pat. No. 4,235,751.

DESCRIPTION

1. Technical Field

This invention relates to a modified clay and to its use as a polymerization catalyst. It is more particularly directed to a modified montmorillonite clay and to its use as a catalyst in the polymerization of tetrahydrofuran (THF) and an alkylene oxide (AO).

2. Background Art

Processes for catalytically preparing THF/AO polymerizates using montmorillonite clays as catalysts are known. One such process is shown in U.S. Pat. No. 4,127,513 to Harold Edward Bellis. According to the Bellis process, THF and an AO are catalytically polymerized using as the catalyst a montmorillonite clay which has been acid activated so that it contains, per gram 0.1–0.9 milliequivalent of hydrogen ions having $pK_a$ values of $-3$ to $-8$.

While the Bellis clay catalyst is quite satisfactory, it has been found that the clay catalyst of the present invention can provide a polymerization rate higher than that of Bellis, with its accompanying benefits, and with less color formation in the product during the early stages of polymerization. In addition, the clay catalyst of the invention has greater physical strength than that of Bellis so that it can be used with less physical degradation and attrition.

DISCLOSURE OF THE INVENTION

The clay catalyst of the invention is prepared from a type of naturally occurring granular sodium montmorillonite clay known as Wyoming bentonite. A clay of this class, "KWK Volclay" bentonite, is sold by American Colloid Company of Skokie, Ill. "Granular", in this context, defines a particulate clay 90% of which passes through a 20 mesh U.S. Sieve ($-20$ mesh), but is retained on a 70 mesh U.S. Sieve ($+70$ mesh).

The clay catalyst of the invention is prepared by first holding the clay starting material (raw clay) at a temperature of 300°–600° C. for about 1–20 hours, in air, preferably 450°–550° C. for 2–6 hours.

The thus heat-treated clay is next impregnated with an organic liquid which is capable of being intercalated into the clay and finding its way into the clay's interstices. Illustrative or organic liquids which can be used are THF, p-dioxane, and ethers such as diethyl ether and dibutyl ether. THF is preferred. Impregnation can be accomplished by any conventional technique, but is preferably done by simply stirring the clay in the liquid at a temperature of about 0°–60° C., preferably 20°–25° C. This treatment is continued until no more liquid is taken up by the clay, as determined visually. The time required to complete the impregnation step will vary with the temperature of the liquid and the particle size of the clay, but will in most cases be 4–20 hours.

The thus impregnated clay is then optionally stripped of residual organic liquid, "residual" being defined as that liquid which is not entrained by the clay. The stripping is done by first separating the clay and the liquid by decantation, filtration or centrifugation, and then passing air at ambient temperature through the clay until the clay particles no longer cohere.

The stripped clay is then acid-activated. This is done by bringing the clay into contact with 5–30%, preferably 10–20%, by weight, of aqueous hydrochloric acid for 1–18 hours at a temperature of about 20°–100° C. The acid-activation is ordinarily accomplished by immersing the clay in a bath of acid, with gentle stirring, until the activation is complete, as is well known in the art. Strong acids such as nitric, sulfuric and phosphoric (all forms) can also be used to activate the clay.

The clay is then separated from the acid solution by decantation, filtration or centrifugation, and is washed with water, preferably distilled or deionized water, until it is substantially free of acid anions. "Substantially free" means that most of the anions have been removed, only a small insignificant number remaining. When hydrochloric acid is used, this point is determined by adding aqueous silver nitrate solution to the wash water effluent and then visually inspecting the effluent for silver chloride precipitate.

If desired, the clay can then be dried by heating it. The temperature is preferably held below about 150° C. to maintain the clay's high activity. It is preferred that the catalyst be subjected to the drying step because water functions as a chain terminator in the THF/AO polymerization and its presence in the catalyst may therefore affect the polymerization adversely.

The clay catalyst thus prepared, with or without the drying step, can be used directly in the polymerization of THF and an AO.

The THF used in the polymerization can be any kind ordinarily used to prepare THF/AO polymers.

The AO used can be any containing two or three carbon atoms in its oxide ring. It can be unsubstituted or substituted with, for example, alkyl or aryl groups, or with halogen atoms. Illustrative of such alkylene oxides are ethylene oxide; 1,2-propylene oxide; 1,3-propylene oxide; 1,2-butylene oxide; 1,3-butylene oxide; 3,3-bis-chloromethyl-1,3-propylene oxide, styrene oxide and epichlorohydrin.

The polymerization is carried out by first preparing a 5–20%, by weight, slurry of the clay catalyst in THF. A mixture of THF and an AO is then separately prepared, with the THF and oxide present in such proportions to one another as will give a copolymer with a THF/AO weight ratio of 20–80/80–20, preferably 60–65/40–35. To this mixture is added 0.2–6%, by weight, of a chain terminator. Illustrative of chain terminators which can be used are water, 1,4-butanediol, ethylene glycol, 1,6-hexanediol, trimethylolpropane, glycerine and pentaerythritol. Enough of the resulting THF-AO-chain terminator mixture is then added to the clay slurry to give a clay concentration of about 3–25%, preferably 5–20%, by weight, in the mixture.

The resulting reaction mass is then held at 40°–90° C., preferably 68°–80° C., with constant stirring, until a polymerizate having the desired molecular weight is obtained, as determined by periodic sampling and spectroscopic analysis. This ordinarily requires a reaction time of 10–240 minutes.

The clay is then separated from the reaction mass by filtration, decantation or centrifugation, and unreacted THF is separated from the remaining liquid by distillation, leaving the THF/AO polymerizate behind.

The THF/AO polymerization is preferably run in a continuous fashion. When run this way, the same relative amounts of catalyst and reactants, and the same temperatures and reaction times are used as in the batch mode. A slurry of clay is first prepared in a 50–60%, by weight, solution of batch-prepared THF/AO polymerizate in THF. This slurry is stirred, heated to the reaction temperature and held there, with stirring, while a mixture of THF, AO and chain terminator, in the desired proportions, is slowly added to it. The clay catalyst can be held in the reaction zone by suitable filters or screens. After a suitable residence time, the product, a THF/AO polymerizate, is withdrawn from the reaction zone.

While the clay catalysts of the invention will confer their greatest benefits when used to catalyze the polymerization of THF and AO, they can also be used to catalyze any reaction normally catalyzed by montmorilonite clay, e.g., the reaction of methanol and isobutylene to form methyl-t. butyl ether.

EXAMPLES

In the following examples, all parts are by weight.

EXAMPLE 1—BEST MODE

Ten parts of granular Volclay KWW, U.S. Sieve −10 +35, was held at 500° C. for 3 hours. The clay was then cooled to ambient temperature and immersed in THF at 20°–22° C. for 16 hours. At the end of the immersion period, the clay was separated from the THF by vacuum filtration to give a light-colored, free-flowing granular product.

This product was added to 30 parts of 20% hydrochloric acid and stirred gently for 3 hours at 60°–80° C. The slurry was then cooled to ambient temperature, allowed to settle, and the acid decanted.

The clay was then added to 30 parts of deionized water, stirred gently for about 10 minutes, and the water decanted. This washing step was repeated until the water effluent gave no precipitate when tested with silver nitrate solution.

The clay was then dried at 100° C. for 5 hours, and was ready for use as a catalyst.

EXAMPLE 2

(1) Into a reactor having a reflux condenser and an overflow tube were placed 150 parts of the clay catalyst of Example 1.

(2) Seven hundred fifty parts of a 56% solution of batch-prepared THF/ethylene oxide polymerizate in THF were prepared according to the previous description.

(3) The solution of (2) was added to the reactor of (1), and the resulting slurry was heated to and held at 70° C., with stirring.

(4) A feed slurry solution containing

| | |
|---|---|
| ethylene oxide | 1320 parts |
| water | 99 parts |
| THF | 5180 parts | was added to the slurry of (3), with gentle stirring, at the rate of 18–20 parts per minute.

The polymerizate product was recovered from the reactor as overflow at the rate of 18–20 parts per minute. The THF/ethylene oxide copolymer in the polymerizate contained 49 mol percent of ethylene oxide units.

INDUSTRIAL APPLICABILITY

The THF/AO polymers produced by processes using the clays of the invention as catalysts can be used to prepare polyurethanes according to methods well known in the art.

I claim:

1. In a process for catalytically preparing a tetrahydrofuran/alkylene oxide polymer, the improvement comprising using as the catalyst a material prepared by
   (a) holding a raw granular Wyoming bentonite at a temperature of about 300°–600° C. for about 1–20 hours, in air;
   (b) impregnating the product of (a) with an organic liquid capable of being intercalated into said product;
   (c) activating the product of (b) with hydrochloric acid, nitric acid, sulfuric acid or phosphoric acid;
   (d) removing residual acid from the product of (c); and then
   (e) washing the product of (d) with water until it is substantially free of acid anions.

2. The process of claim 1 wherein the alkylene oxide is ethylene oxide.

3. The process of claim 1 wherein the alkylene oxide is propylene oxide.

4. The process of claim 1 in which residual organic liquid from step (b) is removed before step (c) is performed.

5. The process of claim 1 having the additional step of drying the product of step (e) at a temperature below about 150° C.

* * * * *